Feb. 20, 1962  F. P. HAYBA ET AL  3,021,795
LATCHING MECHANISM
Filed Nov. 4, 1958

INVENTORS
FRANKLIN P. HAYBA
BY ROBERT F. HOTALING
Bosworth, Sessions,
Herrstrom & Knowles
ATTORNEYS.

United States Patent Office 3,021,795
Patented Feb. 20, 1962

3,021,795
LATCHING MECHANISM
Franklin P. Hayba, Euclid, and Robert F. Hotaling, Elyria, Ohio, assignors to Crescent Metal Products, Inc., Cleveland, Ohio, a corporation of Ohio
Filed Nov. 4, 1958, Ser. No. 771,866
5 Claims. (Cl. 104—48)

This invention relates to a latching mechanism and more particularly to a latching mechanism for control of and use with an integrated transportation and storage system for wheeled vehicles.

Integrated transportation and storage systems for wheeled vehicles for use in various industries have been known and used in the past. In the preparation and handling of food, for example, it is frequently desirable to put into or remove from storage in refrigerators or warming ovens large quantities of food. Integrated transportation and storage systems have been utilized to accomplish this purpose. These systems generally comprise wheeled tray supporting racks in which trays of food are carried, wheeled dollies having tracks on the top of their beds on and along which the wheeled tray supporting racks may travel and tracks within the refrigerator or warming oven for receiving the tray supporting racks from the wheeled dollies. With such a system, a loaded wheeled rack on the tracks of a dolly may be carried on the dolly to a track-equipped refrigerator, for example. With the refrigerator door open, the dolly is placed adjacent the refrigerator door opening with the dolly tracks and refrigerator tracks longitudinally aligned. The wheeled tray supporting rack is then moved on and along the aligned tracks from the dolly and into the refrigerator. The dolly is then removed and the refrigerator door closed. When desired, the wheeled rack may be removed from the refrigerator onto an empty dolly properly located at the door opening of the refrigerator and then transported on the dolly to another location. Inherent in such a system is the risk of derailment of the wheeled rack during system operation. Unless such risk can be substantially eliminated, the system is not practicable.

The primary object of our invention is to provide means for substantially eliminating the risk of derailment of the wheeled tray supporting racks from the storage track and/or the transportation track during the operation of an integrated storage and transportation system as described above.

It is a specific object of our invention to provide means for preventing the derailment of the wheeled tray supporting racks from the storage and/or transportation tracks when a wheeled rack travels from one track to the other because of misalignment of the track.

It is another specific object of our invention to provide means for preventing the derailment of the wheeled tray supporting racks from said storage and/or transportation tracks because of separation of the otherwise normally adjacent ends of the tracks.

It is yet another specific object of our invention to provide means for preventing the derailment of the wheeled tray supporting racks due to the inadvertent travel of a rack along and past the ends of the storage and/or transportation tracks when these tracks are not in endwise engagement.

We accomplish these and other objects by our invention of a guidance and control system comprising automatic guiding means for aligning the storage and transportation tracks during transfer of the wheeled rack along the tracks and semi-automatic latching means for holding the tracks in matching relationship adjacent to each other and for holding the wheeled racks at predetermined positions along said tracks as will be readily appreciated as the invention becomes better understood by reference to the following detailed description when considered in connection with the accompanying drawings in which:

Figure 1:
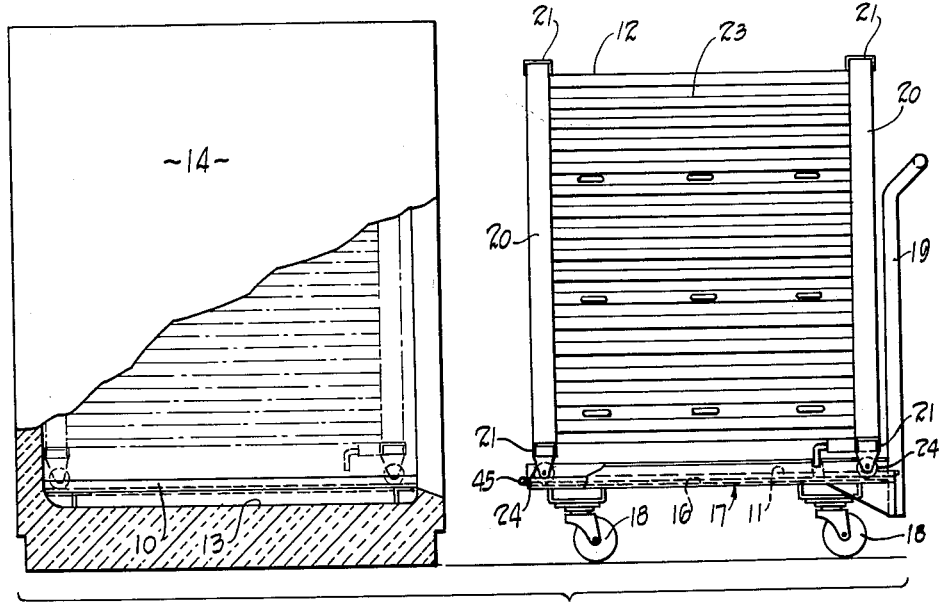
FIGURE 1 is an elevation view of a typical integrated transportation and storage system such as may utilize a latching mechanism of our invention.

A typical integrated transportation and storage system embodying our invention is shown in FIGURE 1. The system is comprised of a storage track 10, a transportation track 11 and a wheeled tray supporting rack 12. The storage track 10 is mounted horizontally on the floor 13 of a refrigerator 14, part of whose side wall has been broken away to show the interior of the refrigerator. The transportation track 11 is mounted on the horizontal bed 16 of a wheeled dolly, indicated generally by 17. The wheeled dolly 17 is provided with swiveled caster wheels 18 and an upright handle 19 by means of which the dolly 17 may be easily moved about from place to place. The tray supporting rack 12, shown in position on the transportation track 11 of dolly 17 in FIGURE 1, is generally of a construction well known in the art having upright members 20 at its corners and lateral members 21 extending transversely between and connecting the upright members 20. Two sides 23 of the rack 12 are formed of corrugated sheet material and together cooperate to receive and support trays, racks and pans or the like. Wheels 24 are fitted to the bottom of rack 12 for rolling engagement with storage track 10 and transportation track 11.

It will be noted that the storage track 10 within refrigerator 14 and the transportation track 11 mounted on dolly 17 are, by design, the same vertical distance above the floor upon which refrigerator 14 and the dolly 17 stand and move about, respectively. Thus, the storage track 10 and the transportation track 11 may be brought into end-to-end abutment with each other when the dolly 17 is moved adjacent to open refrigerator 14. Transportation track 11 extends longitudinally forward of the forward caster wheels 18 of the dolly 17 so that track 11 will reach over sill of refrigerator 14 when dolly 17 is moved into a position adjacent open refrigerator 14.

In this typical rack storage and transportation system, storage track 10 and transportation track 11 have two channel-type parallel rails 31 and 32, respectively. The two rails 31 of storage track 10 are laterally spaced apart the same distance as the two rails 32 of transportation track 11. Thus, the rails of storage track 10 and transportation track 11 can, by proper positioning of dolly 17, be brought into vertical, lateral and longitudinal alignment. The dolly 17 is moved into this position of track-matching relationship when it is desired to transfer the wheeled rack 12 from dolly 17 into refrigerator 14 or vice versa. With such a system of stationary storage tracks 10 and mobile transportation tracks 11, wheeled racks 12 may be easily, quickly and conveniently moved into and out of refrigerators 14 or the like or moved about outside of and away from refrigerators 14.

Figure 2:
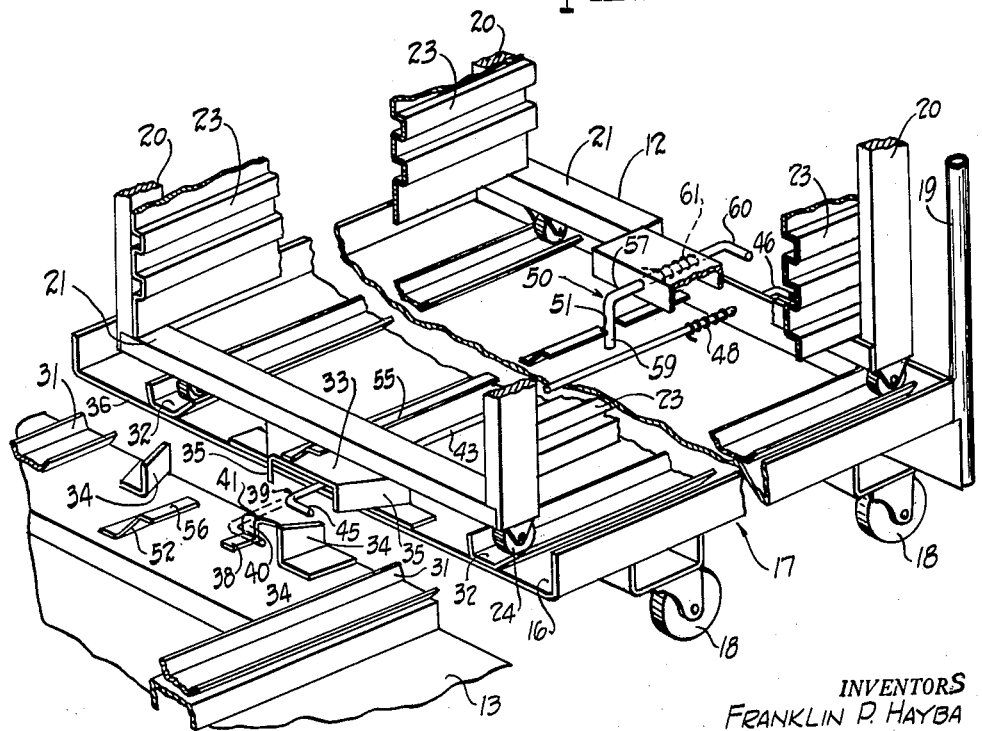
FIGURE 2 shows in perspective a portion of a typical integrated transportation and storage system with portions thereof broken away to clearly show in detail a preferred embodiment of our invention.

We have found that such a system for transporting and storing tray supporting racks or the like is difficult to operate, wasteful of time, inconvenient and, indeed, impracticable unless provided with a guidance and control system such as the system of our invention. A preferred embodiment of our invention shown in FIGURES 1 and 2 provides means for automatically guiding dolly 17 into the position of track-matching engagement with refrigerator 14. This guidance means consists of a double wedge or keystone-shaped tongue 33 which is rigidly connected to and projects forwardly from the bed 16 of dolly 17 and a keystone-shaped receiving slot within refrigerator 14 defined by a pair of angles 34. The tongue 33 is located on the bed 16 of dolly 17 substantially midway between the rails 32 of transportation track 11. The vertical side walls 35 of tongue 33 converge and would, if extended, meet at a point forward of and remote from the forward edge 36 of dolly 17. The angles 34 are located in a spaced apart and angled relationship within refrigerator 14 so that when dolly 17 is steered into a position of approximate track-matching engagement with refrigerator 14, the vertical faces of angles 34 will automatically engage and guide the vertical faces 35 of tongue 33 and, thus, guide dolly 17 into a position of precise track-matching engagement.

The preferred embodiment of our control system also comprises a first latching mechanism for automatically holding dolly 17 in a position of track-matching engagement with refrigerator 14. This latching mechanism is comprised of a latch 38 located between the rails 31 of storage track 10 within refrigerator 14 and a spring-loaded bolt 39 mounted between the rails 32 of transportation track 11 on dolly 17. The latch 38 is provided with a vertical shoulder 40 facing inwardly of the refrigerator 14, an inclined camming surface 41 extending downwardly and outwardly with respect to refrigerator 14 from the top of vertical shoulder 40. The bolt mechanism is comprised of a rod 43 that extends longitudinally from front to back of and is mounted for axial rotation on wheeled dolly 17. The end of rod 43 extending forward of the front edge of dolly 17 is formed with a right angle to provide the latch-engaging portion 45 of bolt 39. Latch-engaging portion 45 normally lies in a plane parallel to a plane containing tracks 10 and 11. The rearwardly extending portion of rod 43 is formed in a right angle rearwardly of the back edge of dolly 17 to provide a manually operable handle 46 by which rod 43 may be axially rotated. Interconnecting rod 43 and dolly 17 is a helical spring 48 arranged to yieldably maintain axially rotatable rod 43 in its normal or idle position as determined by the orientation of latch-engaging portion 45 of the bolt 39. Thus, by means of handle 46, bolt 39 may be operated so that rod portion 43 rotates axially against the restoring force of spring 48 and causes the free end of latch-engaging portion 45 to move upwardly from its normal position. Also, as dolly 17 is brought into a position of track-matching engagement with refrigerator 14, the latch-engaging portion 45 of bolt 39 will engage and ride upwardly on the camming surface 41 of latch 38, rotating rod portion 43 against the restoring force of spring 48. Latching portion 45 of bolt 39 and vertical shoulder 40 of latch 38 are so located with respect to each other that the latching portion 45, urged by spring 48, will return to its normal position inwardly of vertical shoulder 40 thereby locking dolly 17 to refrigerator 14.

It will be noted that the guidance means provided by our invention acts to align bolt 39 with latch 38 for proper latching engagement as well as to laterally and longitudinally align the storage track 10 and transportation track 11.

The preferred embodiment of our control system also comprises a second latching mechanism for automatically locking tray supporting rack 12 at a predetermined location on and along transportation track 11 of wheeled dolly 17 and also at a predetermined location on and along storage track 10 within refrigerator 14. This second latching mechanism is comprised of a bolt 50 carried by tray supporting rack 12 for engagement by and with a latch 51 associated with wheeled dolly 17 and a latch 52 associated with and within refrigerator 14. Angle guide strip 55 extends longitudinally forwardly of latch 51 along the bed 16 to the forward edge of tongue 33 of the guidance means. Extending outwardly from latch 52 is an angle guide strip 56 so formed and located as to provide a continuation of angle strip 55 on dolly 17 when the dolly is in track-matching engagement with refrigerator 14. Thus, when the dolly is in such engagement with refrigerator, angle guide strips 55 and 56 form a continuous guide extending longitudinally between latch 51 on the dolly and latch 52 within the refrigerator. The purpose and function of angle guide strips 55 and 56 will be explained more fully below.

Bolt 50 is comprised of a longitudinally extending rod 57 or the like mounted for axial rotation through the after lower lateral member 21 of the tray supporting rack 12. Both ends of rod 57 are formed at right angles; the forward angle part forms a latch-engaging portion 59 and the rearward angle part forms a manually operable handle 60. Interconnecting rack 12 and the longitudinally extending rod 57 is a helical spring 61 adapted to yieldably hold latch-engaging portion 59 in a downwardly directed latch-engaging position. Latch 51 is provided by a transverse slot or opening in angle guide 55, the latching being accomplished by portion 59 of bolt 50 occupying the transverse opening in angle guide 55 when the wheels 24 of rack 12 are all on and along transportation track 11. Latch 52 is provided by the rearwardly facing transverse end of angle guide 56 which is engaged by portion 59 of bolt 50 when all of the wheels 24 of rack 12 are all on and along storage track 10. Angle guides 55 and 56, vertically, laterally and longitudinally aligned when dolly 17 is in a position of track-matching engagement with refrigerator 14, serve to provide a camming surface for holding against the restoring force of spring 61 latch-engaging portion 59 of bolt 50 rotated out of its latch-engaging position as bolt 50 is carried between positions of latching engagement with latch 51 and latch 52 by the movement of rack 12 on and along tracks 10 and 11.

It will be noted that the guidance means provided by our invention acts to laterally and longitudinally align angle guide 55 with angle guide 56 as well as performing its other guidance functions.

Assuming tray supporting rack 12 initially to be on wheeled dolly 17 with latching portion 59 of bolt 50 engaging latch 51 and dolly 17 to be at a point remote from refrigerator 14, the control system of our invention operates in the manner hereinafter described. Wheeled dolly 17 is pushed by means of handle 19 into an approximate position of track-matching engagement with the front opening of refrigerator 14. As dolly 17 is brought adjacent the opening of refrigerator 14, tongue 33, extending forwardly of dolly 17, engages the vertically extending sides of angles 34 within the refrigerator to bring transportation track 11 and storage track 10, angle guide 55 and angle guide 56, as well as bolt 39 and latch 38 into the proper position of operating and matching engagement. At the same time that the guidance means is functioning to finally align the tracks and various portions of the control system mentioned above, latch engaging portion 45 of bolt 39 is being rotated by camming surface 41 of latch 38 upwardly to the top of vertical shoulder 40. When dolly 17 is finally adjacent refrigerator 14, final alignment of all the coacting parts of dolly 17 and refrigerator 14 is complete and latch-engaging portion 45 of bolt 39 is rotated by spring 48 back to its normal position so that the hooks behind vertical shoulder 40 of latch 38 automatically locking dolly 17 to refrigerator 14. It will be noted that tongue 33, at this time fully engaged with angles 34 serves to prevent the unlocking of dolly 17 of refrigerator 14 by lateral displacement of the dolly.

In order to move tray supporting rack 12 from dolly 17 into refrigerator 14, handle 60 of bolt 50 is operated to swing latch-engaging portion 59 of the bolt out of the transverse opening and from behind latch 51. At the same time as the operation of handle 60, rack 12 is displaced forwardly. Latch-engaging portion 59 of bolt 50 then will be automatically held in its rotated position by angle guide 55. Rack 12 is then pushed from dolly 17 on and along transportation track 11 into refrigerator 14 on and along storage track 10. When rack 12 is entirely within refrigerator 14 and its storage position therein, latch-engaging portion 59 of bolt 50 reaches latch 52 and the end of angle guide 56 at which time, spring 61 swings latch-engaging portion 59 into engagement with latch 52 automatically locking rack 12 in its storage position in refrigerator 14. Handle 46 is then operated to disengage bolt 39 from latch 38 and the dolly is free to move away and handle and transport other tray supporting racks. The removal of rack 12 from refrigerator 14 by means of dolly 17 is essentially the reverse of the storage operation described above.

Changes, modifications and improvements may be made to the above-described preferred and modified forms of our invention without departing from the precepts and principles of the invention. Therefore, we do not wish our patent to be limited to any particular form of our invention specifically illustrated and described nor in any manner inconsistent with the extent to which our invention has promoted the art.

We claim:

1. In combination with an integrated transportation and storage system for a wheeled vehicle including a length of stationary storage track and a length of transportation track fixedly mounted on a movable dolly and adapted to have a matching end-to-end relationship with said storage track, a latching system for controlling the relationship between said storage track and said transportation track and for controlling said wheeled vehicle on said tracks, said latching system comprising means for automatically engaging and holding said transportation track in said relationship with said storage track, means for manually releasing said transportation track from said matching relationship with said storage track, means for automatically engaging and holding said wheeled vehicle at predetermined positions on and along said transportation and said storage track comprising a spring-loaded bolt associated with said wheeled vehicle and a discontinuous cam extending longitudinally along said tracks and adapted to receive and engage said bolt at its points of discontinuity and means for manually releasing said wheeled vehicle from said predetermined positions whereby said wheeled vehicle may be moved on and along said transportation and storage tracks.

2. In combination with an integrated transportation and storage system for a wheeled vehicle including a length of stationary storage track and a length of transportation track fixedly mounted on a movable dolly and adapted to have a matching end-to-end relationship with said storage track, a latching system for controlling the relationship between said storage track and said transportation track and for controlling said wheeled vehicle on said tracks, said latching system comprising means for automatically guiding said transportation track into matching relationship with said storage track as said dolly approaches said stationary track, means for automatically engaging and holding said transportation track in said position of matching relationship with said storage track, means for manually releasing said transportation track from said matching relationship with said storage track, means for automatically engaging and holding said wheeled vehicle at predetermined positions on and along said transportation and said storage track comprising a spring-loaded bolt associated with said wheeled vehicle and a discontinuous cam extending longitudinally along said tracks and adapted to receive and engage said bolt at its points of discontinuity and means for annually releasing said wheeled vehicle from said predetermined positions whereby said wheeled vehicle may be moved on and along said transportation and storage tracks.

3. In combination with a wheeled dolly, a stationary first length of parallel spaced apart tracks, a second length of parallel spaced apart tracks of the same gauge as said first length fixedly mounted on said dolly and transportable by said dolly into and away from a position of matching engagement with said first length of track and a wheeled vehicle adapted to travel on and along said first and second lengths of track, the improvement of a latching system for holding and releasing said lengths of track in and from said position of matching engagement with each other, said latching system comprising a latch associated with said first length of track and a spring-loaded bolt mechanism associated with said second length of track, and an inclined camming surface associated with said latch adapted to automatically cam said bolt mechanism against its spring-loading into a position of spring-loaded locking engagement with said latch as said first and second lengths of track approach a position of matching engagement, said bolt mechanism having manual means for disengaging said bolt mechanism from said latch.

4. In combination with a wheeled dolly, a stationary first length of parallel spaced apart tracks, a second length of parallel spaced apart tracks of the same gauge as said first length fixedly mounted on said dolly and transportable by said dolly into and away from a position of matching endwise engagement with said first length of track and a wheeled vehicle adapted to travel on and along said first and second lengths of track, the improvement of a latching system for locking said wheeled vehicle against travel at predetermined locations along said sections of track, said latching system comprising a first latch associated with and at a predetermined position along said second length of track, a second latch associated with and at a predetermined position along said first length of track, a camming surface extending longitudinally between said first latch and said second latch and a spring-loaded bolt mechanism associated with said wheeled vehicle adapted to automatically engage said first latch and said second latch at predetermined positions along said tracks and to ride said longitudinally extending camming surface when said wheeled vehicle travels on and along said first and second lengths of track between said predetermined positions thereon and manual means for disengaging said bolt from both said first and said second latches.

5. In combination with a wheeled dolly, a stationary first length of parallel spaced apart tracks, a second length of parallel spaced apart tracks of the same gauge as said first length fixedly mounted on said dolly and transportable by said dolly into and away from a position of matching engagement with said first length of track and a wheeled vehicle adapted to travel on and along said first and second lengths of track, the improvement of a latching system for holding and releasing said lengths of track in and from said position of matching engagement with each other and for locking said wheeled vehicle against travel at predetermined locations along said sections of track, said latching system comprising a first latch associated with said first length of track and a first spring-loaded bolt mechanism associated with said second length of track, and an inclined camming surface associated with said first latch adapted to automatically cam said bolt mechanism into locking engagement with said latch as said first and second lengths of track approach a position of matching engagement, said first bolt mechanism having manual means for disengaging said first bolt mechanism from said first latch, a second latch associated with and at a predetermined position along said second length of track, a third latch associated with and at a predetermined position along said first length of track, a camming surface extending longitudinally between said second latch and said third latch and a second spring-loaded bolt mechanism associated with said wheeled vehicle and adapted to automatically engage said second latch and said third latch at predetermined positions along said tracks and to ride said longitudinally extending camming surface when said wheeled vehicle travels on and along said first and second lengths of track between said predetermined positions thereon and manual means for disengaging said bolt from both said second and said third latches.

References Cited in the file of this patent

UNITED STATES PATENTS

| | | |
|---|---|---|
| 642,315 | Fitton et al. | Jan. 30, 1900 |
| 1,249,305 | Black | Dec. 11, 1917 |
| 2,019,949 | Brace | Nov. 5, 1935 |
| 2,090,135 | Linder | Aug. 17, 1937 |
| 2,526,819 | Henderson | Oct. 24, 1950 |
| 2,691,449 | Claybourn | Oct. 12, 1954 |
| 2,832,297 | Daniels | Apr. 29, 1958 |